United States Patent
Eriksson et al.

(10) Patent No.: US 8,115,173 B2
(45) Date of Patent: Feb. 14, 2012

(54) IMPLEMENTATION OF WAVELENGTH SHIFTERS IN PHOSWICH DETECTORS

(75) Inventors: Lars A. Eriksson, Oak Ridge, TN (US); Charles L. Melcher, Oak Ridge, TN (US); Ronald Grazioso, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 917 days.

(21) Appl. No.: 12/110,554

(22) Filed: Apr. 28, 2008

(65) Prior Publication Data

US 2009/0121141 A1    May 14, 2009

Related U.S. Application Data

(60) Provisional application No. 60/914,411, filed on Apr. 27, 2007.

(51) Int. Cl.
*G01T 1/20* (2006.01)
*G01T 1/00* (2006.01)

(52) U.S. Cl. ............ 250/367; 250/486.1
(58) Field of Classification Search .......... 250/367, 250/486.1, 487.1
See application file for complete search history.

(56) References Cited

U.S. PATENT DOCUMENTS

| | | | |
|---|---|---|---|
| 6,078,052 A * | 6/2000 | DiFilippo | 250/367 |
| 6,448,559 B1 * | 9/2002 | Saoudi et al. | 250/367 |
| 7,102,135 B2 * | 9/2006 | Lecoq | 250/363.03 |
| 2004/0104356 A1 * | 6/2004 | Bross et al. | 250/486.1 |
| 2005/0087693 A1 * | 4/2005 | Sumiya et al. | 250/367 |
| 2006/0106306 A1 * | 5/2006 | Essner et al. | 600/436 |
| 2008/0121806 A1 * | 5/2008 | Grazioso | 250/363.03 |

FOREIGN PATENT DOCUMENTS

WO    WO 03/001242 A1    1/2003

OTHER PUBLICATIONS

Erikkson, et al, "Design Considerations of Phoswich Detectors for High Resolution Positron Emission Tomography", IEEE Trans Nucl Sci, vol. 56, Issue 1, Feb. 2009, pp. 182-188.

* cited by examiner

*Primary Examiner* — David Porta
*Assistant Examiner* — Carolyn Igyarto
(74) *Attorney, Agent, or Firm* — Peter L. Kendall

(57) ABSTRACT

A phoswich device for determining depth of interaction (DOI) includes a wavelength shifting layer between first and second scintillators of different scintillation materials and having different decay time characteristics. The wavelength shifting layer allows a true phoswich device to be constructed where the emission wavelength of one scintillator is in the peak excitation band of the other scintillator, by shifting the scintillation light outside of this excitation band to prevent scintillation light of one scintillator from exciting a response in the other scintillator, thus enabling unique identification of the location of a gamma photon scintillation event. The phoswich device is particularly applicable to positron emission tomography (PET) applications.

12 Claims, 4 Drawing Sheets

IMPLEMENTATION OF WAVELENGTH SHIFTERS IN PHOSWICH DETECTORS

CROSS-REFERENCE TO RELATED APPLICATION AND CLAIM OF PRIORITY

This application is a non-provisional of and claims priority to under 35 U.S.C. §119(e) Application Ser. No. 60/914,411 filed Apr. 27, 2007.

TECHNICAL FIELD

The present invention is in the field of nuclear medical imaging. In particular, the present invention relates to techniques for accurate detection of emission radiation in nuclear medical imaging processes such as positron emission tomography (PET).

BACKGROUND OF THE INVENTION

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT), electron-beam X-ray computed tomography (CT), magnetic resonance imaging (MRI), and ultrasound (US). Using these or other imaging types and associated machines, an image or series of images may be captured. Other devices may then be used to process the image in some fashion. Finally, a doctor or technician may read the image in order to provide a diagnosis.

In traditional PET imaging, a patient is injected with a radioactive substance with a short decay time. As the substance undergoes positron emission decay, it emits positrons which, when they collide with electrons in the patient's tissue emit two simultaneous gamma rays. The gamma rays emerge from the patient's body at substantially opposite directions. These rays eventually reach a scintillation device positioned around the patient. There is often a ring of scintillation devices surrounding the patient. When the gamma rays interact with oppositely positioned scintillation devices, light is emitted and detected. The light is usually transmitted through a lightguide to a photodetector. The light detected by the photodetector is then interpreted by a processor to enable an image of a slice of the region of interest to be reconstructed.

In PET (as well as SPECT) it is important to match the scintillator emission wavelength to the photodetector's optimal wavelength quantum efficiency (QE). For example, a typical photomultiplier tube (PMT) used in PET applications has a peak wavelength sensitivity at 420 nm while a typical LSO scintillator used in PET emits at 420 nm. Therefore, PMTs and LSO are very well matched in terms of wavelength matching. LSO is a very good scintillator for a PMT but it is not well matched for use with other silicon-based photodetectors such as avalanche photodiodes (APDs) and silicon photomultipliers (SiPMs). These silicon photodetectors usually have a peak wavelength sensitivity at $\geq 500$ nm. In some devices, such as SiPMs, their QE may increase 2-3 times from 420 nm to >500 nm. It is difficult to make a scintillator with good PET properties and to make it emit at an exact wavelength for photodetection. Such a scintillator may be made from crystal materials such as, but not limited to, LSO, YSO, LYSO, LuAP (i.e., $LuAlO_3$:Ce), LuYAP, or LaBr3.

The phoswich approach has been used to improve the detection in PET applications by determining the depth-of-interaction (DOI) in the detector. PET scanners are typically made of long, thin detectors with high stopping power to meet high sensitivity requirements. In the absence of DOI information, however, the thickness of the scintillator reduces the spatial resolution due to parallax error. To compensate for reduced spatial resolution, detectors with DOI capability have been used. DOI capability can determine the location of the gamma interaction in the direction of the incident gamma (i.e., depth from the surface of the detector). One way to implement DOI capability is to use a multi-layer detector, in which the layers are made of material with different scintillation properties. Because the layers have different characteristics, when a gamma event is detected it is possible to identify which layer absorbed the gamma photon and so to determine more accurately the spatial interaction location in three dimensions. A "phoswich" thus is a detector with two or more layers of different scintillators. Layer identification is done by using differences in scintillation decay time and pulse shape discrimination techniques. The advantages of the concept have been demonstrated in the HRRT high resolution PET system using a LSO/LYSO combination giving a high spatial resolution uniformity of around 2.5 mm within a larger part of the imaged volume. Since LSO and LYSO have the same excitation and emission characteristics, layer identification is based on pulse shape discrimination as the LSO and LYSO materials have a difference in scintillation time of approximately 10-15 ns.

Two phoswich combinations that have been gaining popularity are LuAP/LSO and LuYAP/LSO. LaBr3/LSO has also been investigated. However, the functionality of these phoswich combinations is somewhat limited because both LuAP and LaBr3 emit in the excitation band of LSO, YSO or LYSO. For the phoswich to work well the scintillations of the two components must be independent of each other. However, since the emission of LuAP and LaBr3 scintillators are in the excitation band of LSO, both scintillators will be activated by a single 511 keV absorption and it is thus difficult to achieve a unique scintillation layer identification.

There thus remains a need in the art for a true phoswich (i.e., a phoswich using different scintillator types) that can provide an easily obtained unique detector identification for DOI calculations.

SUMMARY OF THE INVENTION

The present invention solves the existing need in the art to determine the depth of interaction for a PET detector using different scintillation materials in a phoswich detector. The present invention uses a wavelength shifting layer (WLS) as an interface between LSO and, for example, LuAP in a phoswich combination. A unique scintillator identification can be assisted by using a wavelength shifting material to absorb light at a short wavelength (higher energy) and re-emit the light at a longer wavelength (lower energy). Wavelength shifter bars can be made of solid organic materials (polymers). Dyes can also be used in wavelength shifting. An example of a wavelength shifting material can have an absorption peak at 420 nm and an emission peak at 494 nm. The phoswich combination is coupled to a photodetector which detects a unique identification. The WLS ensures that a unique identification is achieved by shifting the emission wavelength from 360 nm, which is the excitation band of LSO, to 450 nm.

According to a first embodiment, a phoswich device is provided, which is comprised of a first scintillator type arranged to detect incident radiation, coupled to a wavelength shifting layer. The wavelength shifting layer is further coupled to a second scintillator type, which is coupled to a photodetector.

In a second embodiment, a phoswich device is provided, which is comprised of the second scintillator arranged to detect incident radiation, which is coupled to a wavelength shifting layer. The wavelength shifting layer is further coupled to the first scintillator, which is coupled to a photodetector.

According to another aspect of the invention, a PET scanner is provided. The PET scanner includes a number of phoswich devices having a plurality of first scintillator type detectors with a wavelength shifting material sandwiched between a plurality of second scintillator type detectors. The PET scanner also includes a number of photodetectors coupled to the plurality of second type scintillators, a processor for receiving data from the photodetectors, and software running on the processor for analyzing the data from the photodetectors and for reconstructing a tomographic image from the PET data.

BRIEF DESCRIPTION OF THE DRAWINGS

The invention will now be described in greater detail in the following by way of example only and with reference to the attached drawings, in which.

DETAILED DESCRIPTION OF THE INVENTION

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
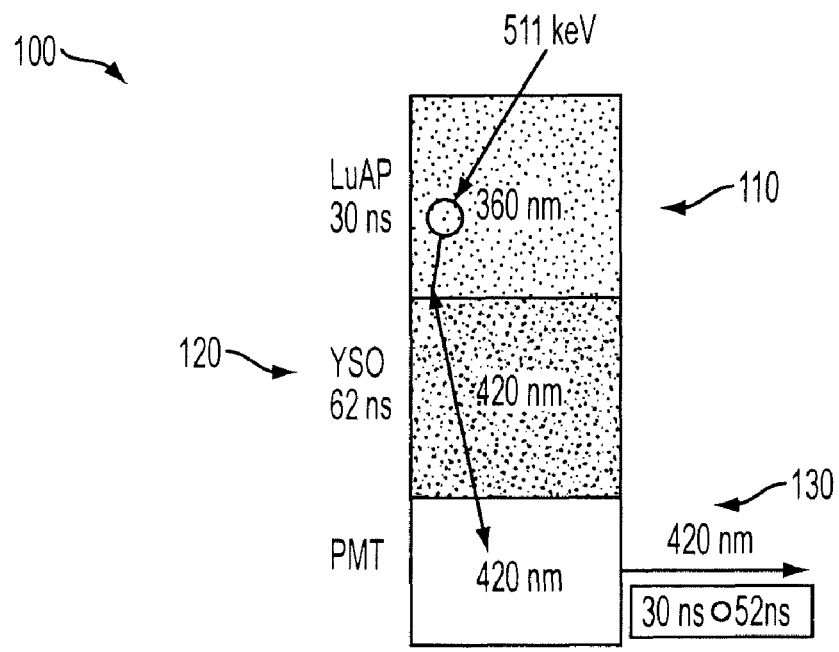
FIG. 1 is a depiction of a known phoswich detector configuration.

FIG. 1 depicts a known phoswich combination 100 that has been considered for PET imaging. The phoswich combination 100 has a first type scintillator crystal 110 made of LuAP. When a 511 keV gamma photon is absorbed in the LuAP crystal 110, it emits light scintillations around 360 nm, with a scintillation time of 30 ns. The light photons travel out of the LuAP scintillator array 110, absorbed by YSO scintillator array 120, and re-emitted at 420 nm with a scintillation time of 62 ns. The 420 nm enters into photodetector 130, where the light photons are converted into an electrical signal. An exemplary photodetector 130, such as a photomultiplier tube, sees the 420 nm light with decay time characteristics given as convolution between the decay time of the LuAP crystal and the decay time of the YSO crystal. The following equation shows how the decay time characteristics seen by the PMT 130 are obtained.

$$\tau(combined) = \tau(LuAP) \otimes \tau(YSO) \qquad \text{Equation 1}$$

Consequently, the characteristics of light event pulses originating in the LuAP crystal cannot be easily distinguished from the characteristics of light event pulses originating in the YSO crystal in response to a primary absorption of a 511 keV gamma photon.

Figure 2:
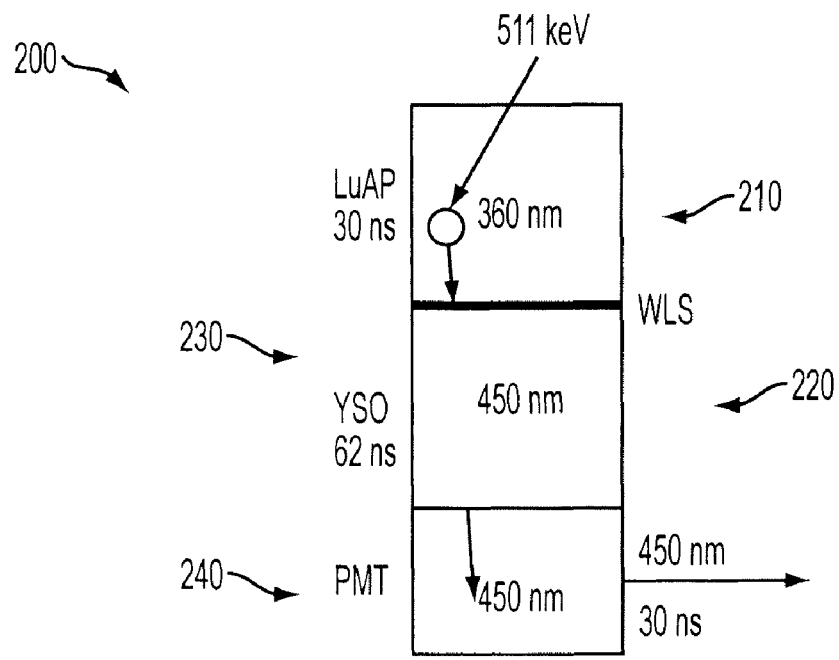
FIG. 2 is a depiction of a phoswich detector where the wavelength shifting layer is sandwiched between two scintillators, in accordance with an embodiment of the present invention.

FIG. 2 depicts a first embodiment of the present invention, comprising a phoswich device 200. The phoswich device 200 includes a LuAP scintillator 210, a YSO scintillator 230, and a fast wavelength shifting layer 220 between the LuAP and YSO scintillators. When a 511 keV gamma photon is absorbed in the LuAP scintillator 210, it emits light scintillations around 360 nm. The light photons travel out of the LuAP scintillator 210 and are absorbed by fast wavelength shifting layer 220, which has a scintillation time of approximately 3 ns. The wavelength shifting layer 220 converts the LuAP light emission from 360 nm to 450 nm while still keeping most of the LuAP decay time characteristics. The converted 450 nm light travels through the YSO scintillator 230 without exciting any response from the YSO crystal as the 450 nm is outside of the YSO excitation band. The 450 nm light exits from the YSO crystal 230 and enters into the PMT 240. The PMT 240 thus sees 450 nm light with a decay time characteristic substantially the same as that of the LuAP scintillator. Conversely, when a 511 keV photon travels through the LuAP crystal 210 and is absorbed by the YSO scintillator 230, the YSO scintillator emits 420 nm light with a decay time of 62 ns. Thus, identification of the location of the gamma interaction can be easily made.

Figure 3:
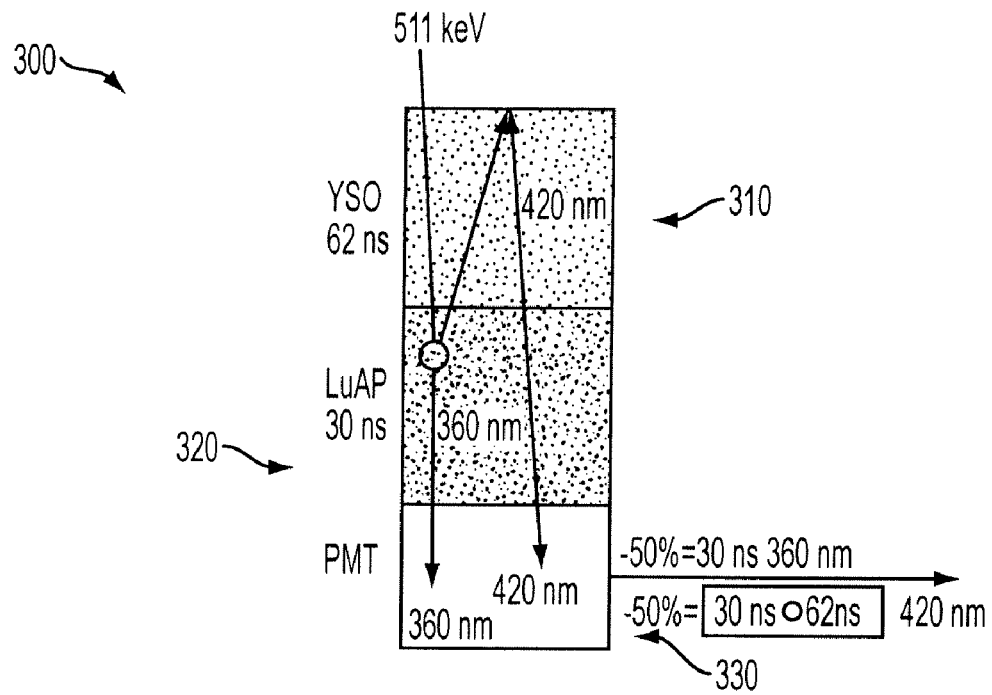
FIG. 3 a depiction of yet another known phoswich detector configuration.

FIG. 3 depicts another phoswich configuration 300, in which the LuAP and YSO crystals of FIG. 1 are reversed. Specifically, the YSO scintillator 310 is located on top of the LuAP scintillator 320, which is in turn coupled to the PMT 330. In this configuration, when a 511 keV gamma is absorbed by the LuAP scintillator 320, only approximately 50% of the 360 nm scintillation light reaches the PMT 330. The other 50% of the LuAP scintillation light is emitted upwards into the YSO scintillator, absorbed by the YSO scintillator and re-emitted as 420 nm light with decay time characteristics as in Equation 1 above. The 420 nm YSO light travels through the LuAP crystal 320 and enters into photodetector 330. Thus in this configuration, only 50% of the scintillation light from the LuAP scintillator is available for detection by the PMT 330, reducing sensitivity. Further, unless reflected components are reduced, the mix of 50% light from the LuAP crystal and 50% light from the YSO crystal renders unique phoswich layer identification complicated and difficult.

Figure 4:
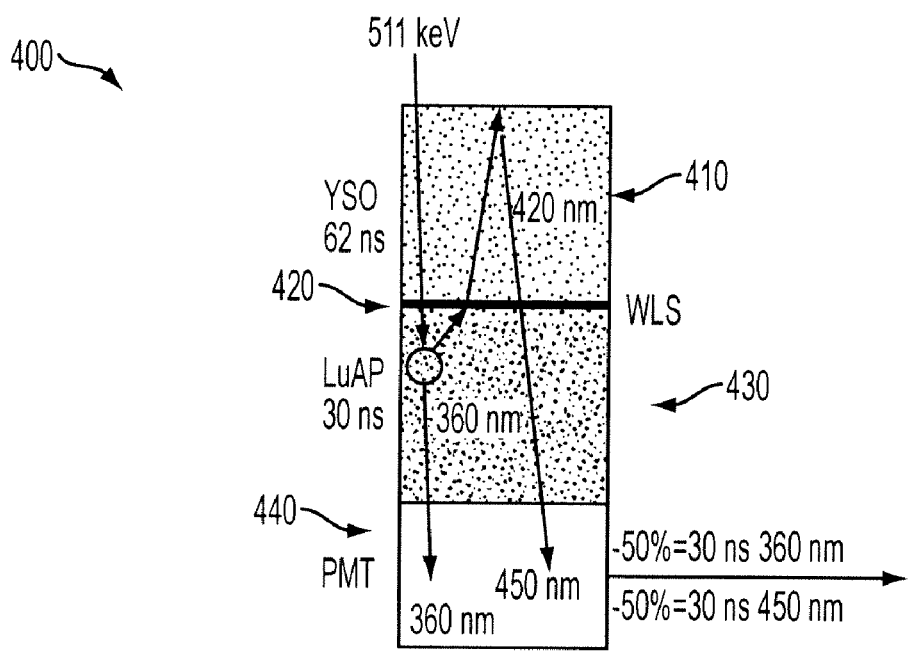
FIG. 4 is a depiction of a phoswich detector where the wavelength shifting layer is sandwiched between two scintillators, in accordance with a second embodiment of the present invention.

FIG. 4 depicts another embodiment of the present invention as related to the configuration of FIG. 3. Phoswich configuration 400 in this embodiment includes a YSO scintillator 410 on top of a fast wavelength shifting layer 420. The fast wavelength shifting layer 420 is coupled to a LuAP scintillator 430. The LuAP scintillator 430 is coupled to a photodetector 440. In this embodiment of the invention, a 511 keV gamma photon passing through the YSO crystal 410 and interacting with the LuAP scintillator 430 will cause the LuAP scintillator to emit 360 nm scintillation light with a decay characteristic of 30 ns. 50% of this light will be directed to the PMT 440 and detected. The other 50% will enter the fast wavelength shifting layer 420 (having a fast decay of approximately 3 ns) where it will be shifted to 450 nm light, and enter the YSO crystal 410. The 450 nm light however is outside of the peak excitation band of the YSO crystal, and thus is not absorbed by the YSO crystal, but instead will eventually be reflected back through the YSO crystal and LuAP crystal and into the PMT 440, where it will be seen by the PMT 440 with a decay time characteristic of approximately 30 ns. Thus, in this embodiment of the invention, substantially all of the scintillation light emitted by the LuAP crystal in response to interaction with a 511 keV gamma is available for detection by the PMT 440, with a unique identification signature of 30 ns decay time. Conversely, 511 keV gammas stopped by the YSO scintillator 410 will result in 420 nm scintillation light being produced in the YSO scintillator with a decay time characteristic of 62, which will travel through the LuAP crystal and into the PMT 440 for unique detection.

Figure 5:
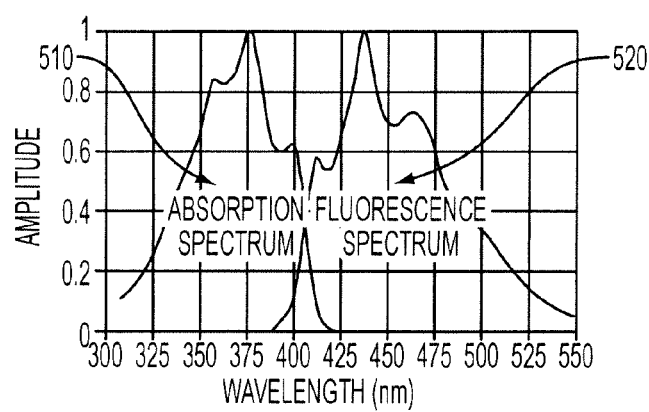
FIG. 5 is a graph showing the absorption and emission wavelengths of an example wavelength shifting material.

FIG. 5 is a graph showing the ranges of an absorption spectrum 510 and an emission spectrum 520 of a typical wavelength shifting material WLS EJ-299-21, which can be used as a wavelength shifting layer 220, 420 in accordance with the invention. The graph shows that the time is approximately 3 ns for wavelength shifting material suitable for use in this invention. Such wavelength shifting material may include, but is not limited to plastic light guide, crystal, and liquid coatings made from wavelength shifting material.

Figure 6:
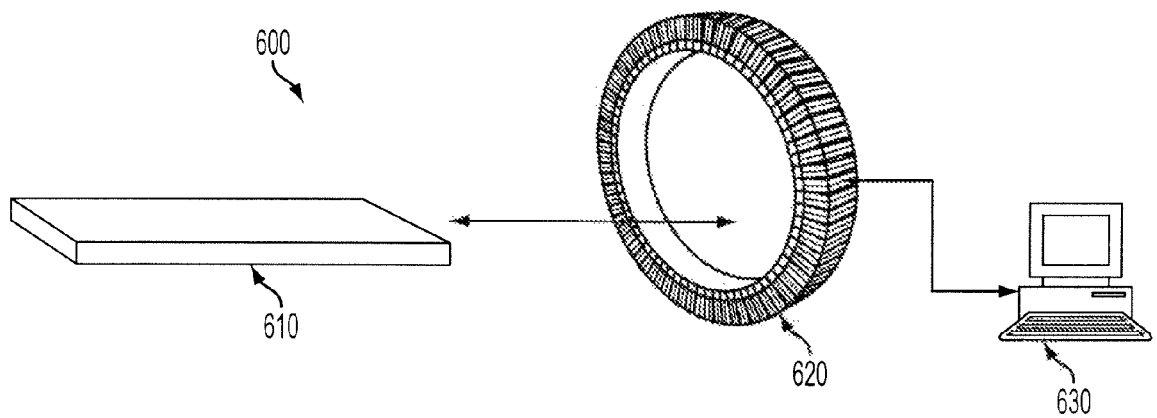
FIG. 6 is a schematic of a PET scanner using a phoswich device in accordance with the present invention.

FIG. 6 is a diagram of a PET scanning system 600 using a wavelength shifting material in the phoswich device in accordance with another aspect of the invention. PET scanning system 600 consists of a number of phoswich detectors 620. The phoswich detectors may be arranged in a ring configuration. The ring of phoswich detectors 620 forms a space large enough for an adult human body to pass. Each phoswich detector may consist of a first scintillator material, a wavelength shifting material, a second scintillator material and a photodetector. The ring of phoswich detectors 620 may be connected to a processor 630. The processor 630 is capable of analyzing the data received from the ring of phoswich detectors 620, reconstructing an image from the acquired data, and outputting tomographic images of the object or patient scanned. The PET scanning system 600 may further include a table or other support structure 610 capable of holding the object or patient to be scanned. The table or other support structure 610 may be adapted to pass through the bore formed by the ring of block detectors 620.

Figure 7:
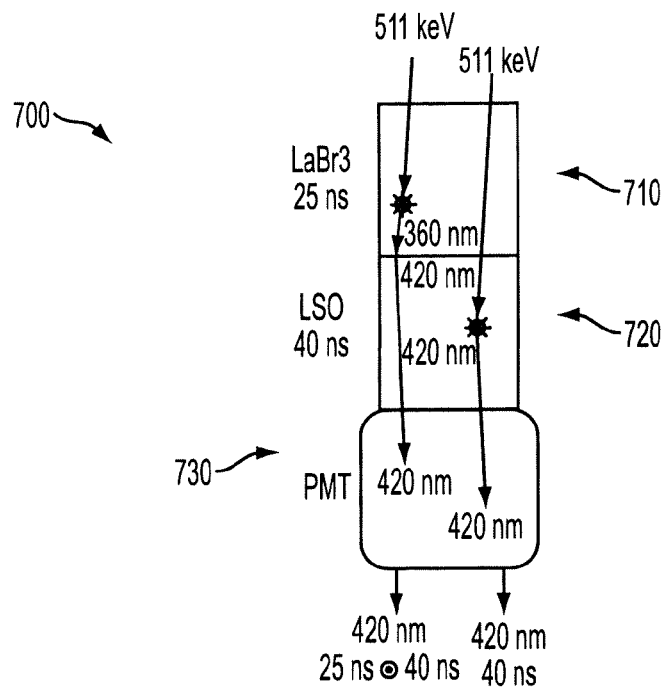
FIG. 7 a depiction of a third known phoswich detector configuration.
Figure 8:
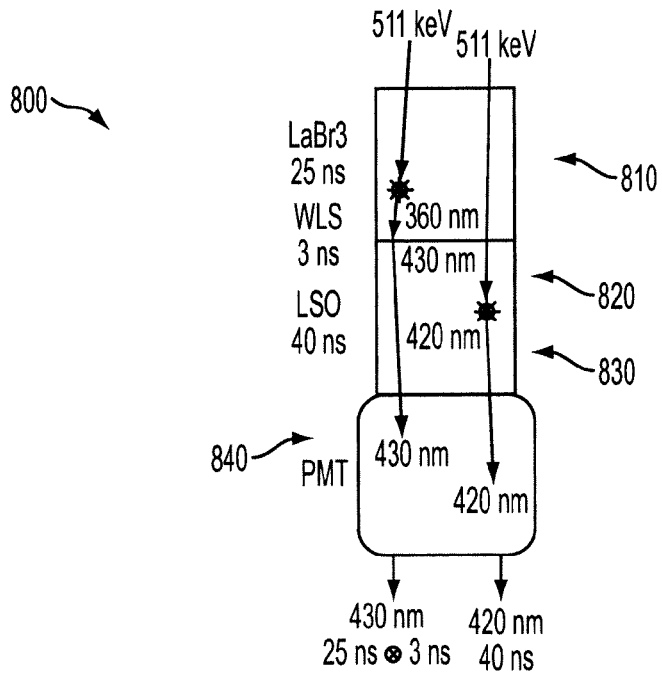
FIG. 8 is a depiction of a phoswich detector where the wavelength shifting layer is sandwiched between two scintillators, in accordance with a third embodiment of the present invention.

Finally, FIGS. 7 and 8 relate to a third embodiment of the invention, which is directed to a phoswich combination of LaBr3 and LSO, similar to the embodiment of FIG. 2. FIG. 7 shows a phoswich 700 with an LaBr3:Ce (0.5% Ce, 25 ns scintillation decay time) scintillator 710 directly coupled to an LSO:Ce scintillator 720. When a 511 keV gamma interacts with the LaBr3 scintillator, 360 nm light is produced, which is absorbed by and excites the LSO scintillator, producing 420 nm light which is seen by the PMT. On the other hand, when a 511 keV gamma photon is stopped by the LSO scintillator, it causes 420 nm light to be directly produced by the LSO scintillator. The scintillation time characteristics seen by the PMT 730 in this case thus are the convolved LaBr3-LSO pulse and the direct LSO:Ce pulse.

In FIG. 8 a phoswich 800 has a thin wavelength shifter 820 (WLS, e.g., Eljen EJ299-21) between an LaBr3:Ce (0.5% Ce, 25 ns scintillation decay time) scintillator 810 and an LSO:Ce scintillator 830. The wavelength shifter 820 is used to shift the LaBr3:Ce light away from the excitation region of the LSO:Ce scintillator. The WLS is 0.1 mm thick and has >95% absorption at 375 nm. The emitted wavelength is 430 nm with a 3 ns scintillation decay time. The scintillation pulse shape in this case is the convolution of LaBr3:Ce and the fast wave length shifter (WLS) with 3 ns scintillation decay time. The resulting convolution is very close to the LaBr3:Ce pulse shape, but now with an emission wave length of 430 nm, far above the LSO:Ce excitation band. Thus, scintillation light from the LaBr3 scintillator does not excite any response in the LSO scintillator and consequently can be uniquely identified by detection in the PMT 840.

The invention having been thus described, it will be apparent to those skilled in the art that the same may be varied in many ways without departing from the spirit and scope of the invention. Any and all such modifications are intended to be covered within the scope of the following claims.

What is claimed is:

1. A phoswich detector comprising:
   a first scintillator having a first scintillation decay time characteristic;
   a wavelength shifting layer coupled to the first scintillator, wherein the wavelength shifting layer increases a wavelength of light emitted from a first scintillator to a value outside of a peak excitation wavelength of a second scintillator;
   a second scintillator having a second scintillation decay time characteristic different from said first scintillator coupled to the wavelength shifting layer; and
   a photodetector coupled to a second scintillator.

2. The phoswich detector of claim 1, wherein the photodetector is a PMT.

3. The phoswich detector of claim 1, wherein the photodetector is a solid-state photodetector.

4. The phoswich detector of claim 3, wherein the photodetector is formed of an APD.

5. The phoswich detector of claim 3, wherein a the photodetector is formed of a SiPM.

6. The phoswich detector of claim 1, wherein the wavelength shifting layer is composed of a polymer.

7. The phoswich detector of claim 1, wherein the first scintillator is a LuAP crystal.

8. The phoswich detector of claim 1, wherein the first scintillator is a LaBr3 crystal.

9. The phoswich detector of claim 1, wherein the second scintillator is a YSO crystal.

10. The phoswich detector of claim 1, wherein the second scintillator is a LSO crystal.

11. The phoswich detector of claim 2, wherein the second scintillator is selected from the group consisting of LSO, YSO, LYSO, and the first scintillator is selected from the group consisting of LuAP, LuYAP and LaBr3.

12. A positron emission tomography (PET) scanner comprising:
   a plurality of scintillation detector modules, each module comprising a first scintillator having a first scintillation decay time characteristic;
   a wavelength shifting layer coupled to the first scintillator, wherein the wavelength shifting layer increases a wavelength of light emitted from the first scintillator to a value outside of a peak excitation wavelength of a second scintillator;

the second scintillator having a second scintillation decay time characteristic different from said first scintillator coupled to the wavelength shifting layer; and a photodetector coupled to the second scintillator;

a processor for receiving PET data from the detector modules; and software executing on the processor for analyzing PET data from the detector modules and for reconstructing a tomographic image based on said PET data.

* * * * *